(12) United States Patent
Calvin

(10) Patent No.: US 12,730,291 B2
(45) Date of Patent: Sep. 8, 2026

(54) APPARATUS AND METHOD OF FOCUSING A LASER-SCANNING CYTOMETER USING THE REFLECTION OF THE LASER

(71) Applicant: Mabtech AB, Nacka Strand (SE)

(72) Inventor: Edward Calvin, Nacka Strand (SE)

(73) Assignee: Mabtech AB, Nacka Strand (SE)

( * ) Notice: Subject to any disclaimer, the term of this patent is extended or adjusted under 35 U.S.C. 154(b) by 370 days.

(21) Appl. No.: 18/253,900

(22) PCT Filed: Nov. 24, 2021

(86) PCT No.: PCT/US2021/060867
§ 371 (c)(1),
(2) Date: May 22, 2023

(87) PCT Pub. No.: WO2022/115637
PCT Pub. Date: Jun. 2, 2022

(65) Prior Publication Data

US 2024/0045189 A1 Feb. 8, 2024

Related U.S. Application Data

(60) Provisional application No. 63/118,123, filed on Nov. 25, 2020.

(51) Int. Cl.
*G02B 21/00* (2006.01)
*G01N 15/1434* (2024.01)
*G01N 15/10* (2006.01)

(52) U.S. Cl.
CPC ....... *G02B 21/006* (2013.01); *G01N 15/1434* (2013.01); *G01N 2015/1006* (2013.01); *G01N 2015/144* (2013.01); *G01N 2015/1452* (2013.01)

(58) Field of Classification Search
CPC .................................................. G02B 21/008
See application file for complete search history.

(56) References Cited

U.S. PATENT DOCUMENTS 6,542,293 B2 4/2003 Yahiro
2001/0033414 A1* 10/2001 Yahiro .................. B01L 3/5085 250/201.3
2006/0209309 A1* 9/2006 Feng .................... G02B 21/006 356/512

(Continued)

FOREIGN PATENT DOCUMENTS

CN 101339129 A 1/2009
CN 205958834 U 2/2017

(Continued)

OTHER PUBLICATIONS

International Search Report dated Feb. 18, 2022 for PCT Application No. PCT/US2021/060867.

(Continued)

*Primary Examiner* — Paisley L Wilson
(74) *Attorney, Agent, or Firm* — EIP US LLP

(57) ABSTRACT

Automated analysis of particles in liquid samples using a laser-scanning confocal microscope. More specifically, embodiments described herein enable a novel method and apparatus for focusing a laser-scanning microscope using the reflection of the laser beam off of the vessel containing the liquid sample.

12 Claims, 8 Drawing Sheets

Initial position of objective lens and focal plane with respect to the sample vessel Final position of objective lens and focal plane with respect to the sample vessel

(56) References Cited

U.S. PATENT DOCUMENTS

| | | | | |
|---|---|---|---|---|
| 2007/0103687 | A1 | 5/2007 | Okazaki | |
| 2010/0157086 | A1* | 6/2010 | Segale | G02B 26/10 348/222.1 |
| 2013/0229493 | A1 | 9/2013 | Ikuta et al. | |
| 2013/0329233 | A1* | 12/2013 | Cohen | G01M 11/0228 356/624 |
| 2014/0226165 | A1 | 8/2014 | Lee et al. | |
| 2017/0045722 | A1 | 2/2017 | Fretel et al. | |
| 2017/0205614 | A1 | 7/2017 | Nakano et al. | |
| 2018/0080870 | A1 | 3/2018 | Yamamoto et al. | |
| 2019/0120746 | A1 | 4/2019 | Calvin | |
| 2020/0033192 | A1 | 1/2020 | Calvin | |
| 2020/0341255 | A1 | 10/2020 | Chan | |
| 2020/0355902 | A1 | 11/2020 | Engel et al. | |

FOREIGN PATENT DOCUMENTS

| | | | |
|---|---|---|---|
| CN | 107085290 | A | 2/2019 |
| EP | 1169632 | B1 | 4/2008 |
| EP | 3151053 | A1 | 4/2017 |

OTHER PUBLICATIONS

Chinese Office Action dated Mar. 29, 2026 for CN Application No. 2021800791627.

* cited by examiner

Figure 1

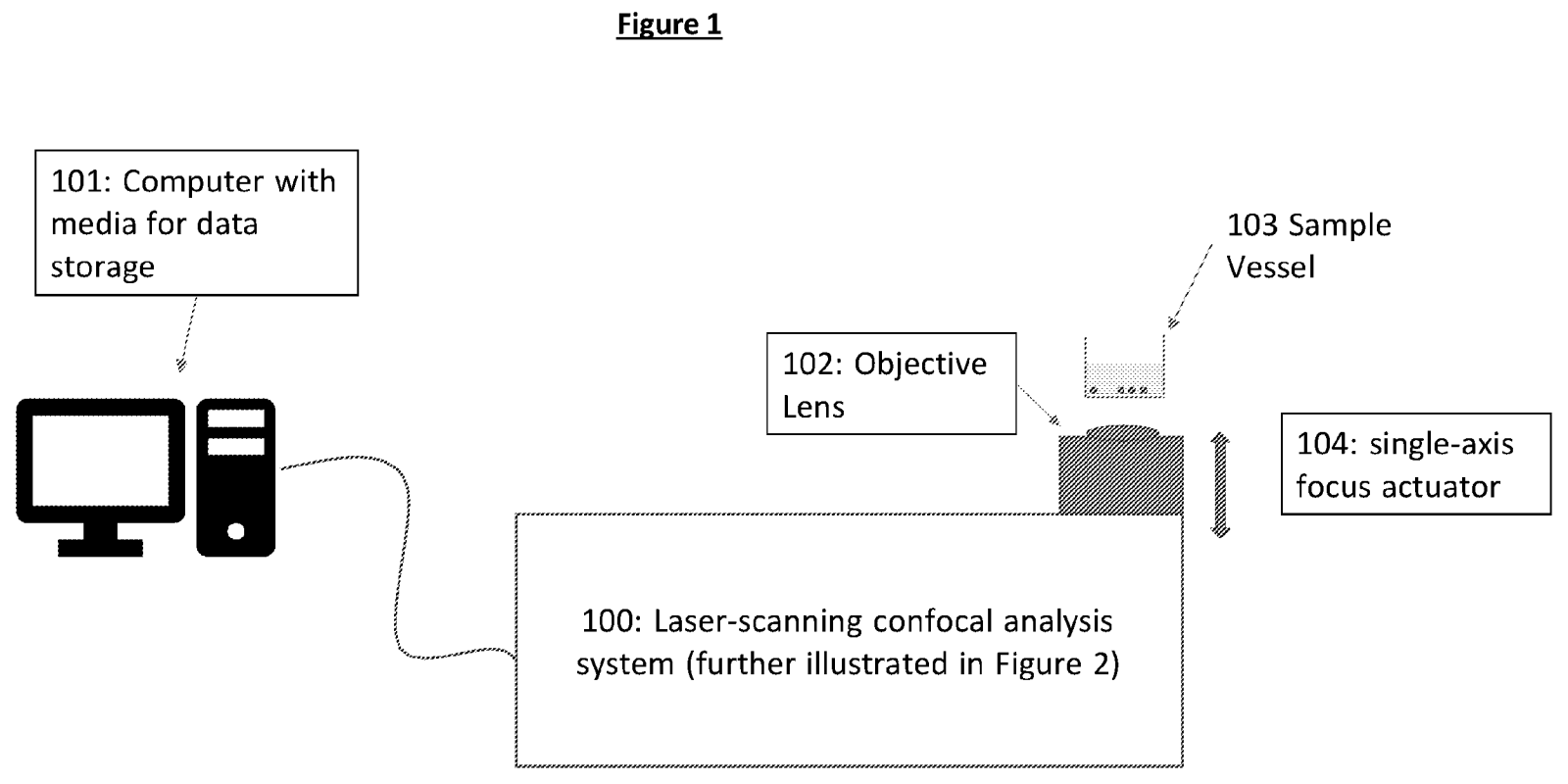

101: Computer with media for data storage

100: Laser-scanning confocal analysis system (further illustrated in Figure 2)

102: Objective Lens

103 Sample Vessel

104: single-axis focus actuator

Figure 2

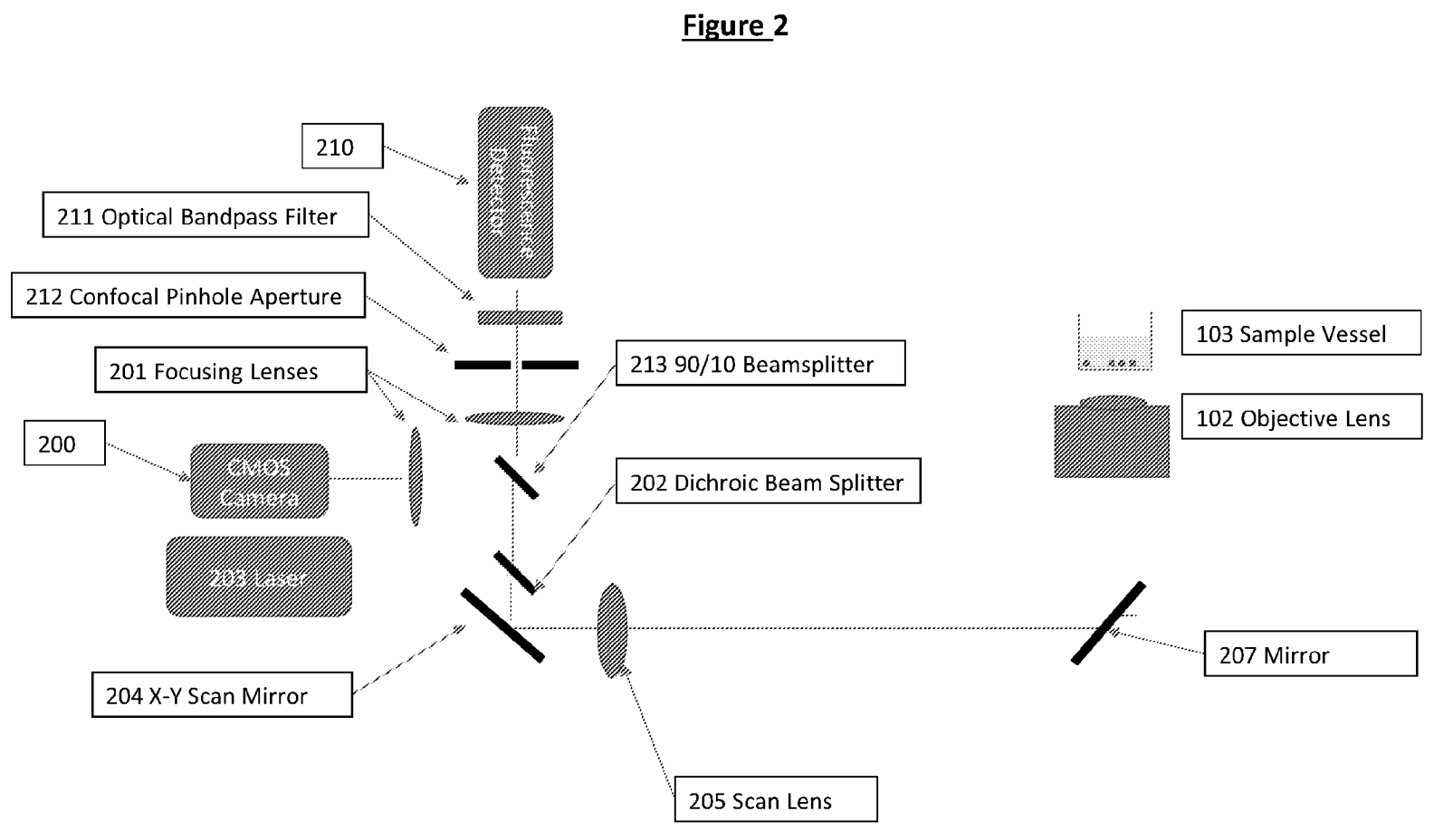

103 Sample Vessel
102 Objective Lens
207 Mirror
213 90/10 Beamsplitter
202 Dichroic Beam Splitter
205 Scan Lens
Fluorescence Detector
210
211 Optical Bandpass Filter
212 Confocal Pinhole Aperture
201 Focusing Lenses
CMOS Camera
203 Laser
200
204 X-Y Scan Mirror

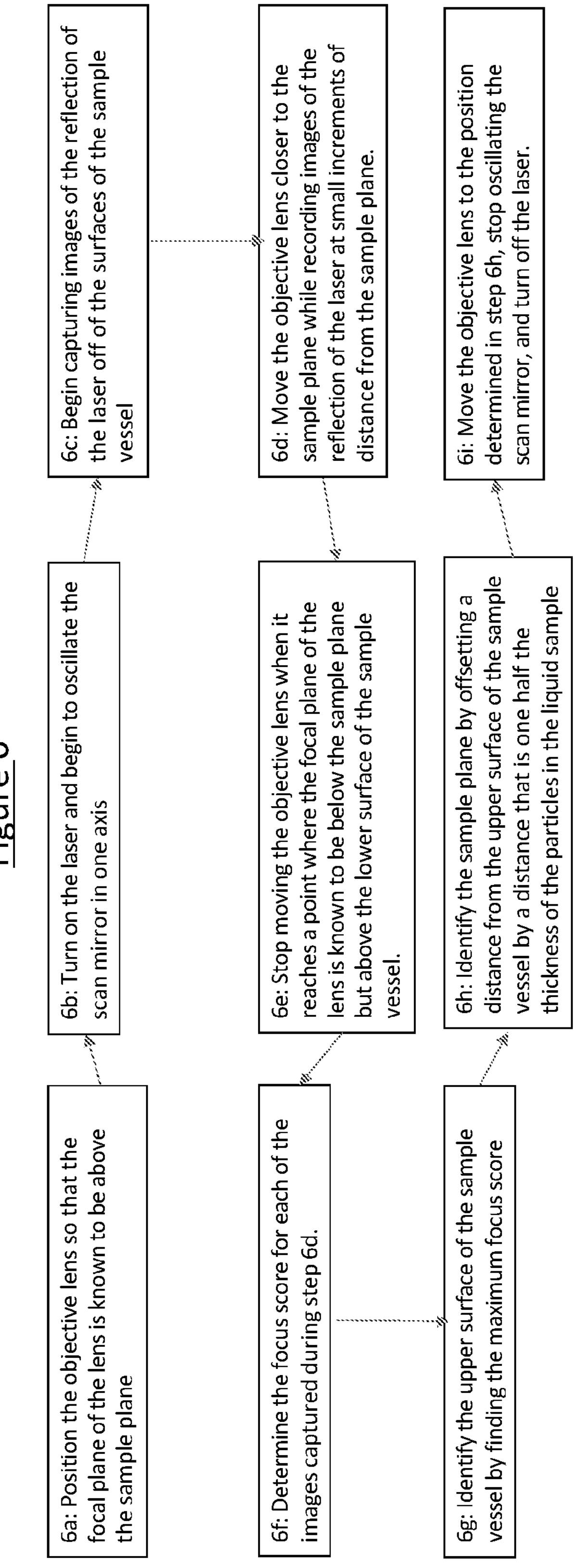
Figure 6
6a: Position the objective lens so that the focal plane of the lens is known to be above the sample plane
6b: Turn on the laser and begin to oscillate the scan mirror in one axis
6c: Begin capturing images of the reflection of the laser off of the surfaces of the sample vessel
6d: Move the objective lens closer to the sample plane while recording images of the reflection of the laser at small increments of distance from the sample plane.
6e: Stop moving the objective lens when it reaches a point where the focal plane of the lens is known to be below the sample plane but above the lower surface of the sample vessel.
6f: Determine the focus score for each of the images captured during step 6d.
6g: Identify the upper surface of the sample vessel by finding the maximum focus score
6h: Identify the sample plane by offsetting a distance from the upper surface of the sample vessel by a distance that is one half the thickness of the particles in the liquid sample
6i: Move the objective lens to the position determined in step 6h, stop oscillating the scan mirror, and turn off the laser.

103 Sample Vessel
104 Sample Plane
701 Focal Plane
102 Objective Lens
Initial position of objective lens and focal plane with respect to the sample vessel 103 Sample Vessel
701 Focal Plane
104 Sample Plane
102 Objective Lens
Final position of objective lens and focal plane with respect to the sample vessel 103 Sample Vessel
701 Focal Plane
104 Sample Plane
102 Objective Lens
Initial position of objective lens and focal plane with respect to the sample vessel 103 Sample Vessel
104 Sample Plane
701 Focal Plane
102 Objective Lens
Final position of objective lens and focal plane with respect to the sample vessel

APPARATUS AND METHOD OF FOCUSING A LASER-SCANNING CYTOMETER USING THE REFLECTION OF THE LASER

BACKGROUND OF THE INVENTION

Field of the Invention

At least one embodiment of the invention relates generally to automated analysis of particles in liquid samples using a laser-scanning confocal microscope. More specifically, embodiments described herein enable a novel method and apparatus for focusing a laser-scanning microscope using the reflection of the laser beam off of the vessel containing the liquid sample.

Description of the Related Art

Measurement of microscopic particles is an integral part of many applications in clinical and life sciences testing as well as research applications. A laser-scanning cytometer that images such particles in a liquid sample and measures the size, shape, light absorption, and fluorescence emission of the particles is one means of making such measurements.

One possible embodiment of a laser-scanning cytometer (LSC) comprises an optically clear vessel containing the sample, an objective lens that focuses excitation light from a laser onto the sample and collects light emitted by the sample, a mirror or set of mirrors used to scan the laser across the sample in a two-dimensional pattern, and at least one detector used to measure the amount of light emitted by the sample at each point in the scan.

Applications frequently require the analysis of many samples at a time. Automating the imaging of the samples so that a large number of samples can be analyzed without requiring the constant attention of an operator is highly desirable. In order to facilitate this automation, the LSC must include a means of focusing each sample. The optical resolution of some LSC systems may be on the order of one micron, and obtaining acceptable focus may require positioning the objective lens with respect to the plane containing the particles in the sample (the sample plane) within a few microns of the optimal focus distance from the sample plane.

BRIEF SUMMARY

Described here is a novel invention that accomplishes automated autofocusing of the objective lens in the LSC in a fast, simple, robust manner.

Embodiments of the invention are utilized in concert with a sample vessel that contains a liquid sample. The sample may contain microscopic particles such as cells or man-made particles such as plastic microspheres. The sample vessel has an optically clear lower surface through which particles in the sample may be observed, measured or imaged. The particles in the sample lie on the lower surface of the sample vessel (the sample plane). It will be appreciated that the bottom surface has a lower surface proximate to an objective lens and an upper surface upon which the microscopic particles are positioned.

An objective lens focuses light from a laser onto a point in the sample plane, i.e., the surface layer of the sample vessel upon which the microscopic particles are positioned. The objective lens collects light emanating from the particles in the sample in response to illumination by the laser. Other embodiments of this invention include a light source that is not a laser but which is focused to a small spot by the objective lens (such as a highly collimated beam of light from a light-emitting diode).

A scan mirror positioned in the path of the laser beam between the laser and the objective lens causes the point at which the laser beam intersects the sample plane to traverse across the sample plane.

An actuator raises or lowers the objective lens to focus the lens on the sample plane. One device that could be used as an actuator is a stepper motor with a captive lead screw configured to raise or lower the objective lens as the stepper motor rotates.

Embodiments of the invention utilize an algorithm implementing the method of autofocusing described herein. The steps in the algorithm include the following:

Position the objective lens at a position known to be below the point where the objective lens is focused on the lower surface of the sample vessel, accounting for uncertainty in the estimate of this position.

Turn on the laser and begin to oscillate the scan mirror in one axis. The scan mirror should oscillate at a speed that is fast enough that the point illuminated by the laser in the focal plane of the objective lens moves by a distance that is greater than the apparent size of the reflection of the laser beam, and ideally several diameters of the reflection of the laser beam.

Begin capturing images using the CMOS camera of the reflection of the laser beam off of the surface of the sample vessel. The reflection will initially be a large spot of relatively low intensity because the objective lens is not focused on any surface.

Begin raising the height of the objective lens with respect to the sample plane while recording images using the CMOS camera at height increments. The height increments could be limited to be no larger than the required focusing accuracy of the LSC system, which will vary according to the type of sample being analyzed and the type of analysis being performed. As the focal plane of the objective lens approaches the lower surface of the sample vessel, the reflection will increase in brightness and the size of the illuminated spot will shrink to a minimum. The reflection will then diminish in brightness and become less sharp until the focal plane of the objective lens approaches the upper surface of the sample vessel, at which point the reflection will again become brighter and the size of the illuminated spot will shrink to a minimum. As the objective lens continues to move upwards, the illuminated spot will again become less bright and less sharp as the focal point of the objective lens moves past the upper surface of the sample vessel and into the liquid of the sample.

Stop moving the objective lens at a location where the focal point is known to be above the sample plane, accounting for uncertainty in the estimate of that position.

For the images collected at each height of the objective lens, calculate a focus score by applying a mathematical function to the pixel values in each image that increases in value as the image of the reflection of the laser beam becomes more intense (higher pixel values) and smaller (occupies a smaller number of pixels).

Identify the lower surface of the sample vessel. The lower surface is identified by finding the first maximum of the focus score encountered as the objective lens is raised from the start position.

Identify the upper surface of the sample vessel by finding the maximum focus score after the objective lens is raised above the lower surface. Smoothing or filtering the focus score data may be necessary to avoid incorrectly identifying a small local variation in the focus score as a maximum focus score.

Identify the sample plane by adding to the height of the upper surface of the sample vessel a distance that is approximately one half the thickness of the particles in the sample, so that the focal plane of the objective lens transects the midpoint of particles lying on the surface of the sample vessel.

Move the objective lens to the location determined in the previous step. In one embodiment, the operator may turn off the laser and stop the scan mirror.

The algorithm is useful where the position of the lower and upper surfaces of the sample vessel are not known a priori with a high degree of accuracy. Because there is no surface below the lower surface of the sample vessel off which the laser can reflect, the method will find this surface very reliably by starting the objective lens at a point sufficiently low that the focal point of the objective lens is known to be below the sample vessel.

After the process described in the previous steps above, an alternative algorithm that only searches for the upper surface of the sample vessel may be utilized for other samples, which minimizes the time require to focus on multiple samples. The upper surface of the sample vessel is the surface upon which the particles may be positioned, assuming the particles are denser than the sample liquid and have settled under the force of gravity. This algorithm is faster than the algorithm described in the previous steps above because it searches over a smaller range of objective lens positions. Because the interface between the liquid of the sample and the air above the sample could be confused with one of the other surfaces, this method requires an initial estimate of the height of the sample vessel such that the focal point of the objective lens is known to start above the upper surface of the sample vessel but within the liquid of the sample. The initial estimate of the height of the sample vessel is known a priori by the operator and supplied to the algorithm as an input.

BRIEF DESCRIPTION OF THE DRAWINGS

FIG. 1 illustrates a LSC system including a laser-scanning confocal analysis system, an objective lens, an actuator which adjusts the position of the objective lens, a vessel containing the sample, and a computer used to control the LSC system and to record data from the LSC system.

FIG. 2 illustrates one possible embodiment of the LSC system including a CMOS camera used for auto-focusing.

FIG. 6 shows an abbreviated version of the algorithm illustrated in FIG. 5 where the approximate height of the sample vessel is known with greater accuracy.

DETAIL DESCRIPTION OF THE INVENTION

Figure 3:
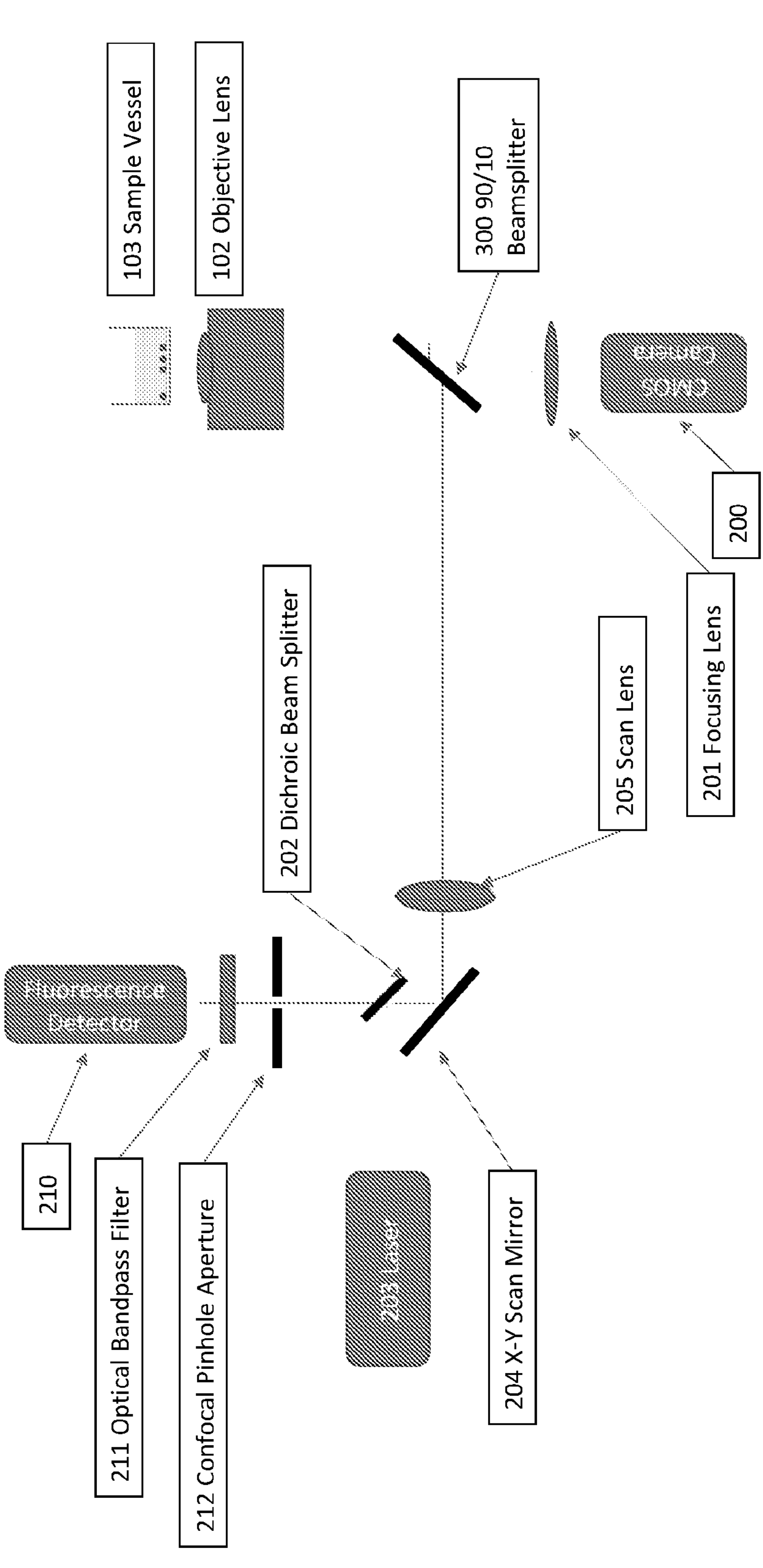
FIG. 3 illustrates a second possible embodiment of the LSC system including a CMOS camera used for auto-focusing.

FIG. 1 illustrates the laser-scanning confocal system described in this invention. A sample vessel (103) contains a liquid sample. The sample may contain microscopic particles such as cells or man-made particles such as plastic microspheres. The sample vessel has an optically clear lower surface through which particles in the sample may be observed, measured or imaged. The particles in the sample lie on the lower surface of the sample vessel (the sample plane). It will be appreciated that the bottom surface has a lower surface proximate to an objective lens and an upper surface upon which the microscopic particles are positioned.

In the examples described in this disclosure, the objective lens is positioned vertically below the vessel containing the sample plane, and the sample plane is oriented horizontally. Moving the objective lens higher relative to the sample plane is equivalent to positioning the objective lens closer to the sample plane. Other embodiments might employ different orientations of the sample plane and objective lens. It will be appreciated that the invention could be equally applied to other orientations. For simplicity, this disclosure uses the convention that the sample plane is always positioned above the objective lens.

An objective lens (102) focuses light from a laser onto a point in the sample plane, i.e., the surface layer of the sample vessel upon which the microscopic particles are positioned. The objective lens collects light emanating from the particles in the sample in response to illumination by the laser. Other embodiments of this invention include a light source that is not a laser but which is focused to a small spot by the objective lens (such as a highly collimated beam of light from a light-emitting diode).

An actuator (104) raises or lowers the objective lens to focus the lens on the sample plane. One device that could be used as an actuator is a stepper motor with a captive lead screw configured to raise or lower the objective lens as the stepper motor rotates.

The system shown in FIG. 1 may include a means of automatically loading a sample for analysis. Loading the samples is outside the scope of this invention and therefore not illustrated. Example means of positioning samples for analysis can be found in prior art.

The laser-scanning cytometer (LSC) system is controlled by a computer (101) with software implementing the method described in this invention disclosure.

FIG. 2 illustrates one possible embodiment of the LSC system.

A laser (203) is used to illuminate particles in the sample, e.g., positioned on the sample plane. The laser is combined into the optical path using a dichroic beam splitter (202) which reflects light at the wavelength of the laser and transmits light at other wavelengths.

An X-Y Scan Mirror (204) that is controlled by the computer aims the laser at different points within the sample plane. The X-Y Scan Mirror (204) could comprise a pair of galvanometer-positioned mirrors oriented to rotate in directions orthogonal to one another or a single mirror mounted on orthogonal gimbals able to rotate around two axes independently. In another embodiment, a rotating mirror with polygonal faces could be used to aim the laser at different points within the sample plane. The objective lens (102) focuses light from the laser to a point lying in the sample plane. By raster-scanning the laser across the entire field of view of the objective lens, the system is able to image particles in the sample plane.

The objective lens collects light emanating from particles in the sample and focuses it onto an image plane. The image plane of the objective lens is coincident with the front surface of the confocal pinhole aperture (212) and aligned so that the image of the point illuminated by the laser is coincident with the pinhole aperture. One or more detectors (one is shown here; 210) measure the fluorescence light from the particle at each point measured in the sample plane, thereby forming an image of the sample. It will be appreciated that the objective lens, scan lens (205), and focusing lens (201) work in combination to create an image of the sample plane on the front surface of the pinhole aperture. Suitable choices of these lenses are readily apparent to those familiar with design of optical systems such as microscopes.

A beamsplitter (213) reflects a small amount of light collected by the objective lens towards the CMOS camera (200). In this embodiment the beamsplitter reflects approximately 10% of the light from the optical path towards the CMOS camera and transmits approximately 90% of the light to the fluorescence detector (210).

A focusing lens (201) is used to create an image of the sample plane on the detector surface inside the CMOS camera. The CMOS camera creates digital images and communicates these to the computer for analysis.

In the embodiment of FIG. 2, the position of the reflection of the laser as observed through the CMOS camera appears constant in space because as the scan mirror moves to aim the laser towards different points in the sample, the area projected onto the CMOS camera detector surface moves in tandem with the laser beam. Thus, while the laser scans across the sample plane, the reflection of the laser as imaged by the CMOS camera appears to be a point that is static in space. Although the dichroic beamsplitter (202) reflects a majority of the laser light, between 1% and 10% of the laser light will be transmitted through the dichroic and subsequently directed towards the CMOS camera by the beamsplitter (213). This quantity of light is sufficient for the CMOS camera to measure.

FIG. 3 illustrates another embodiment of the LSC system that implements this invention. In FIG. 3, the position of the beamsplitter and CMOS camera have been moved. In FIG. 3, the CMOS camera images a field of view of the objective lens that remains constant while the laser scans the sample. While the laser scans the sample, the reflection of the laser as imaged by the CMOS camera as positioned in FIG. 3 will also change.

Either of the embodiments shown in FIG. 2 and FIG. 3 would be acceptable implementations of this invention.

Figures 4A, 4B:
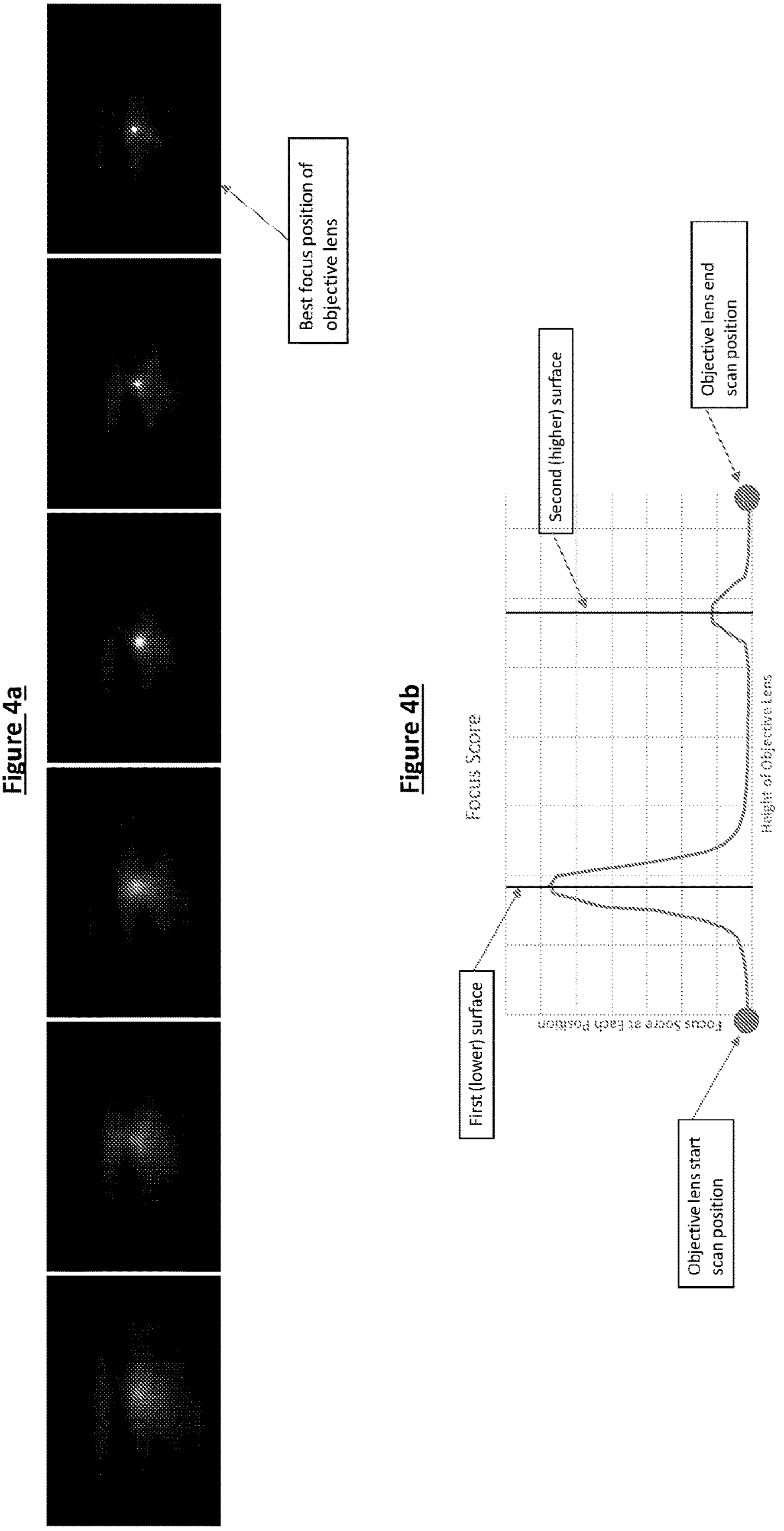
FIG. 4*a* shows images of the reflection of the laser off of the sample vessel surface at several focus positions of the objective lens.
FIG. 4*b* shows the focus score as a function of distance of the objective lens from the sample plane.

FIG. 4*a* shows the image of the reflection of the laser off of the upper surface of the sample vessel (the surface upon which the microscopic particles are positioned) as the position of the objective lens in FIG. 2 is changed with respect to the position of the sample vessel (which remains fixed in space). As the objective lens nears the position with the best focus, the image of the laser beam narrows to a point. Because the objective lens focuses the laser beam while also focusing light emanating from points in the focal plane, the position where the laser beam is focused to the smallest point coincides with the position where the objective lens is focused on the plane of a surface of the sample vessel that reflects light (which could be the upper surface or the lower surface of the sample vessel).

A focus score may be calculated for the images obtained from the CMOS camera at each changed position of the objective lens. One possible method of calculating a focus score that exhibits a maximum value when the objective lens focal plane coincides with a surface of the sample vessels is specified here:

1. For each pixel in the image, determine if the pixel intensity exceeds a threshold. The threshold could be set at 10% of the maximum possible intensity measured by the CMOS camera.
2. If the pixel exceeds the threshold:
   a. add the pixel intensity value to a quantity called the Aggregate Intensity; and
   b. increment the count of pixels that exceed the threshold.
3. After processing each pixel in the manner described in steps 1 and 2, divide the Aggregate Intensity by the count of pixels in the image that exceed the threshold. This quotient is the focus score for the image.

FIG. 4*b* shows the focus score as determined by this method obtained as the objective lens is positioned at different heights with respect to the sample plane. The focus score reaches a maximum value when the objective lens is focused on the lower surface of the sample vessel. The interface between the sample vessel (which is glass or clear plastic) and air is highly reflective compared to the interface between the sample vessel and the liquid in the sample (which is primarily water). It will be appreciated that this phenomenon is caused by the larger difference in refractive indices of air and glass (or plastic) compared to the smaller difference in refractive indices between glass (or plastic) and water for light in the visible spectrum.

For reference, typical refractive indices of the materials relevant to this invention are listed in Table 1. The exact values of these indices are not important to the understanding of this invention.

TABLE 1

Refractive indices of select optical materials at 600 nm

| Material | Refractive index |
|---|---|
| Air | 1.00 |
| Liquid sample (primarily water) | 1.33 |
| Soda lime glass | 1.52 |
| Polystyrene | 1.59 |

Figure 5:
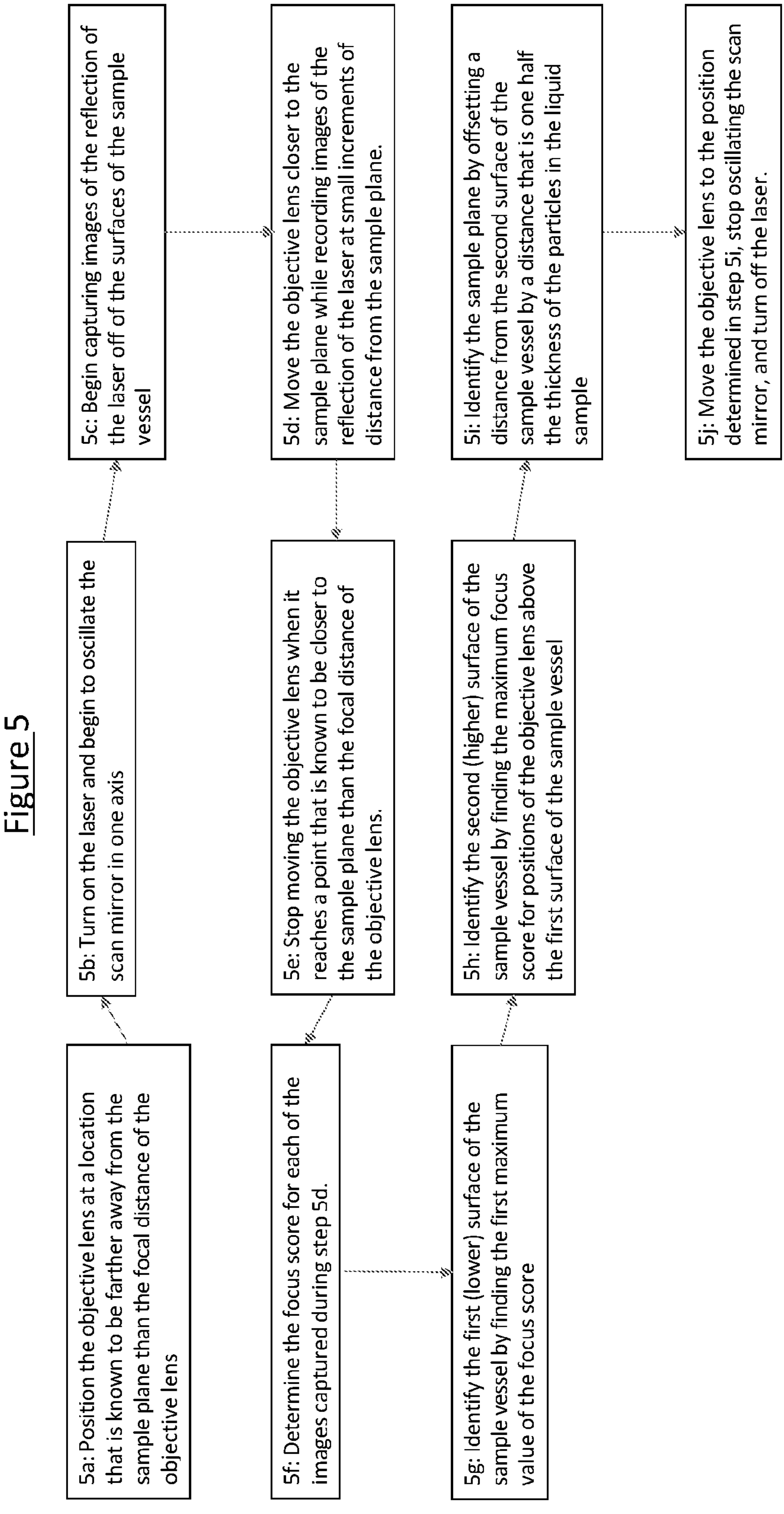
FIG. 5 shows one possible algorithm for auto-focusing the LSC using this apparatus and method.

FIG. 5 illustrates an algorithm implementing the method of autofocusing described in this invention disclosure. The steps in the algorithm include the following:

5*a*: Position the objective lens at a position known to be below the point where the objective lens is focused on the lower surface of the sample vessel, accounting for uncertainty in the estimate of this position. This position is specified in FIG. 7*a*.

5*b*: Turn on the laser and begin to oscillate the scan mirror in one axis. The scan mirror should oscillate at a speed that is fast enough that the point illuminated by the laser in the focal plane of the objective lens moves by a distance that is greater than the apparent size of the reflection of the laser beam, and ideally several diameters of the reflection of the laser beam. It will be appreciated that the exposure time used for the CMOS camera and the amplitude of the angle traversed by the scan mirror will factor into the oscillation speed necessary to meet these criteria.

5*c*: Begin capturing images using the CMOS camera of the reflection of the laser beam off of the surface of the sample vessel. The reflection will initially be a large spot of relatively low intensity because the objective lens is not focused on any surface.

5*d*: Begin raising the height of the objective lens with respect to the sample plane while recording images using the CMOS camera at height increments. The height increments could be limited to be no larger than the required focusing accuracy of the LSC system, which will vary according to the type of sample being analyzed and the type of analysis being performed. As the focal plane of the objective lens approaches the lower surface of the sample vessel, the reflection will increase in brightness and the size of the illuminated spot will shrink to a minimum. The reflection will then diminish in brightness and become less sharp until the focal plane of the objective lens approaches the upper surface of the sample vessel, at which point the reflection will again become brighter and the size of the illuminated spot will shrink to a minimum. As the objective lens continues to move upwards, the illuminated spot will again become less bright and less sharp as the focal point of the objective lens moves past the upper surface of the sample vessel and into the liquid of the sample.

5*e*: Stop moving the objective lens at a location where the focal point is known to be above the sample plane (shown in FIG. 7*a*), accounting for uncertainty in the estimate of that position.

5*f*: For the images collected at each height of the objective lens, calculate a focus score as described above.

5*g*: Identify the lower surface of the sample vessel. The lower surface is identified by finding the first maximum of the focus score encountered as the objective lens is raised from the start position of 5*c*. It will be appreciated that the focus scores of the images may be smoothed using a moving average or other method of filtering so that small variations in the focus score are not counted as maxima.

5*h*: Identify the upper surface of the sample vessel by finding the maximum focus score after the objective lens is raised above the lower surface. As in 5*g*, smoothing or filtering the focus score data may be necessary to avoid incorrectly identifying a small local variation in the focus score as a maximum focus score.

5*i*: Identify the sample plane by adding to the height of the upper surface of the sample vessel a distance that is approximately one half the thickness of the particles in the sample, so that the focal plane of the objective lens transects the midpoint of particles lying on the surface of the sample vessel. For small particle sizes this step may be omitted and the sample plane may be defined to be the same as the upper surface of the sample vessel. The approximate thickness of the particles is known a priori by the user.

5*j*: Move the objective lens to the location determined in step 5*i*. In one embodiment, the operator may turn off the laser and stop the scan mirror.

The algorithm illustrated in FIG. 5 is useful where the position of the lower and upper surfaces of the sample vessel are not known a priori with a high degree of accuracy. Because there is no surface below the lower surface of the sample vessel off which the laser can reflect, the method will find this surface very reliably by starting the objective lens at a point sufficiently low that the focal point of the objective lens is known to be below the sample vessel.

FIG. 6 illustrates an alternative algorithm embodying the method of this invention that only searches for the upper surface of the sample vessel. The upper surface of the sample vessel is the surface upon which the particles may be positioned, assuming the particles are denser than the sample liquid and have settled under the force of gravity. This algorithm is faster than the algorithm illustrated in FIG. 5 because it searches over a smaller range of objective lens positions. Because the interface between the liquid of the sample and the air above the sample could be confused with one of the other surfaces, this method requires an initial estimate of the height of the sample vessel such that the focal point of the objective lens is known to start above the upper surface of the sample vessel but within the liquid of the sample. The initial estimate of the height of the sample vessel is known a priori by the operator and supplied to the algorithm as an input.

In one or more embodiments, after the coarse focusing steps of FIG. 5 are performed, subsequent samples may be focused faster utilizing the steps of FIG. 6, for example by performing for each additional sample:

positioning the objective lens above the sample plane;

turning on the light source and beginning to oscillate the scan mirror in said one axis;

capturing the images using the CMOS camera of the reflection of the light source off of surfaces of the sample vessel;

moving the objective lens closer to the sample plane while recording the images using the CMOS camera at the height increments;

stopping the movement of the objective lens at the location where the focal plane is known to be below the sample plane but above the lower surface of the sample vessel;

calculating the focus score using the images collected at each height of the objective lens;

identifying the upper surface of the sample vessel by finding the first maximum of the focus score encountered as the objective lens is moved from the start position;

identifying the sample plane location by adding to the height of the upper surface of the sample vessel the distance that is approximately one half the thickness of the particles in the sample;

moving the objective lens to the sample plane location.

Figures 7A, 7B:
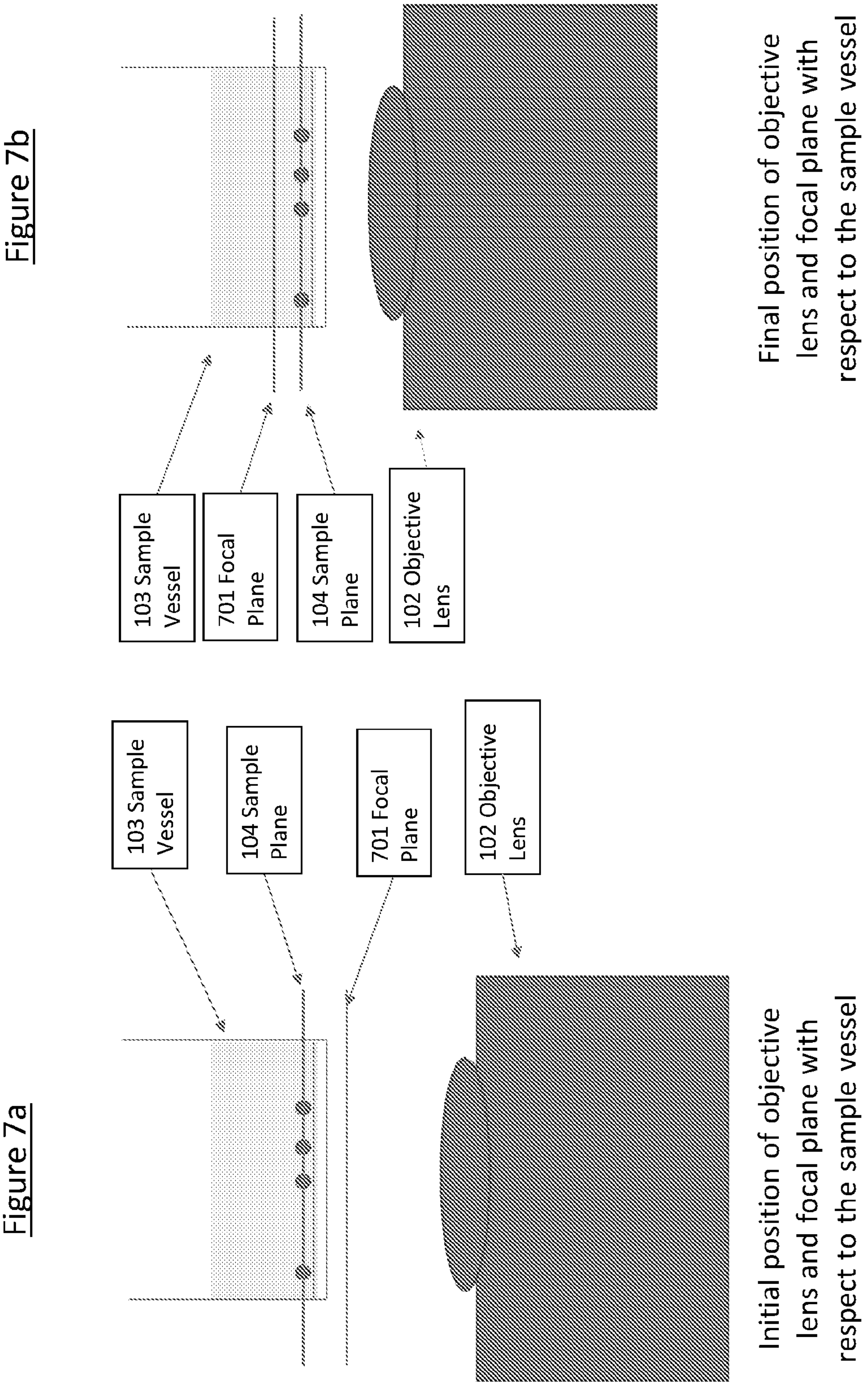
FIG. 7*a* shows the initial position of the objective lens and focal plane at the beginning of the algorithm illustrated in FIG. 5.
FIG. 7*b* shows the final position of the objective lens and focal plane at the end of the algorithm illustrated in FIG. 5.

FIG. 7*a* shows the initial of the objective lens and focal plane of the objective lens with respect to the sample vessel during the algorithm specified in FIG. 5. FIG. 7*b* shows the final position of the objective lens and focal plane. At the start of the procedure the focal plane is located in the air beneath the sample vessel. At the end of the procedure the focal plane is located in the liquid of the sample located above the upper surface of the sample vessel.

Figures 7C, 7D:
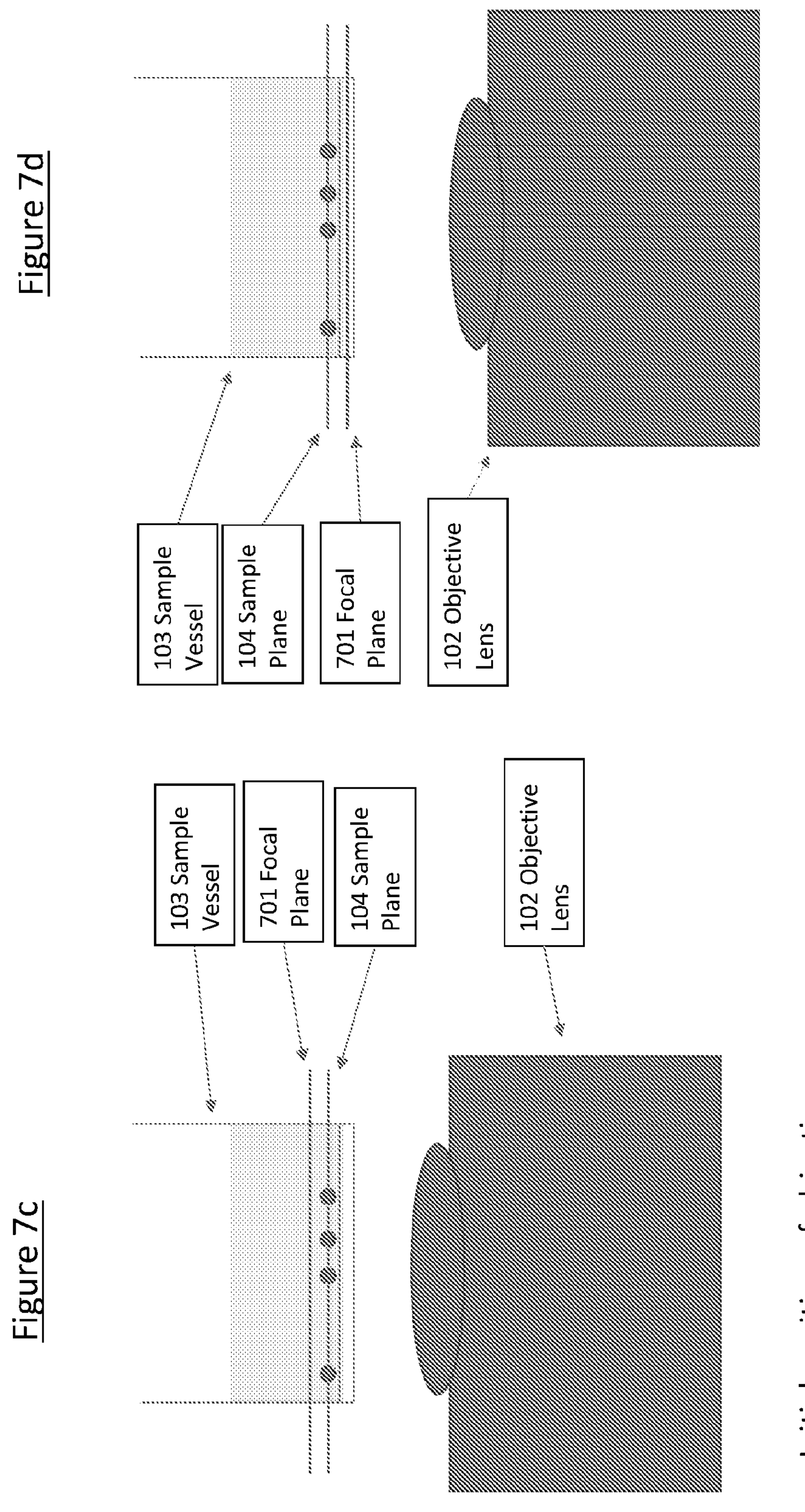
FIG. 7*c* shows the initial position of the objective lens and focal plane at the beginning of the algorithm illustrated in FIG. 6.
FIG. 7*d* shows the final position of the objective lens and focal plane at the end and end of the algorithm illustrated in FIG. 6.

FIG. 7*c* shows the initial position of the objective lens and focal plane of the objective lens with respect to the sample vessel during the algorithm specified in FIG. 6. FIG. 7*d* shows the final position of the objective lens and focal plane. At the beginning of the procedure the focal plane is located in the liquid of the sample located above the upper surface of the sample vessel. At the end of the procedure the focal plane is located within the material (either glass or clear plastic) proximate to the lower surface of the sample vessel. The lower surface of the sample vessel could be as thin as approximately 100 microns, in the case of microtiter plates with thin-film plastic bottom surfaces, or as thick as more than a millimeter in the case of glass microscope slides or microtiter plates with injection-molded plastic bottom surfaces.

It will be appreciated that the sample vessel could take multiple forms. The sample vessel shown in the figures represents a single well of a multi-well microtiter plate. Alternately, the sample vessel could be a microscope slide with the sample positioned on top of the slide (either with or without a coverslip). Other configurations are also possible.

It will be appreciated that moving the sample vessel relative to the objective lens would be substantially equivalent to moving the objective lens relative to the sample with regard to this invention, and that moving either the sample vessel or the objective lens are effective embodiments of this invention.

BENEFITS OF THE INVENTION

This method and apparatus offer multiple benefits, listed below.

1. Because the point where the laser reflects off of surfaces is constantly moving (scanning) in a direction orthogonal to the direction of motion of the objective lens during the autofocusing process, inaccuracy caused by imperfections in the surfaces of the sample vessel are averaged out.
2. Autofocusing methods using a static laser reflection would result in inaccurate performance if a particle in the sample coincided with the reflection of the laser beam, since the particle creates additional unexpected surfaces. This invention does not suffer from interference of particles coinciding with the laser beam because the laser beam scans a large path relative to the size of the particles in the sample during the focusing process and averages out the effect of one or more particles lying in the path of the laser beam.
3. The effects of diffraction and interference of the laser beam, which is coherent, off of surfaces is minimized because the diffraction will change as the laser scans across the surfaces of the sample vessel and will average out over the exposure time of each image. Diffraction and interference patterns from a static laser beam would create artifacts that confuse autofocusing algorithms.
4. The method requires the addition of a monochrome digital camera, a focusing lens and a beamsplitter, none of which is expensive.
5. The method requires very little laser power. The illumination from the laser can be kept at a level that will not photobleach the fluorescence of sensitive samples.
6. The accuracy of this method derives from the rate at which the laser beam converges to a minimum. This rate of convergence can be adjusted by changing the diameter of the laser beam to make the focusing more or less sensitive to position of the objective lens. It will be readily understood that large diameter beams focused by the objective lens will converge to a smaller minimum (known as the waist of the beam) than smaller diameter beams.
7. The method can be made arbitrarily fast by choosing a camera with a sufficiently high frame rate and a sufficiently fast actuator; and
8. The method only requires liquid to be present in the sample vessel but does not require particles to be present in the sample. Many focusing methods, such as methods based on image contrast, require a minimum amount of objects in the focal plane of the objective lens. These methods fail if either there are too few objects to focus on, or if there are objects above or below the focal plane that come into focus at different objective lens heights.

What is claimed is:

1. A method of focusing a scanning microscope on particles of a liquid sample, wherein the particles are arranged on an upper surface of an optically clear bottom of a sample vessel allowing the particles to be imaged through the bottom using an objective lens arranged below the sample vessel, the method comprising:
   scanning a light beam over the particles, using a scan mirror positioned between a light source and the objective lens, while moving the objective lens towards or away from the bottom of the sample vessel;
   for each of a plurality of positions of the objective lens, capturing an image of a spot formed by the light beam being reflected at the upper surface of the bottom;
   calculating a focus score of each of the images;
   determining, based on the focus score, a position of the upper surface of the bottom in relation to the objective lens; and
   determining a position of a sample plane, passing through a midpoint of the particles arranged on the upper surface, by adding half an average particle thickness to the position of the upper surface; followed by moving the objective lens such that a focal plane of the objective lens coincides with the sample plane.

2. The method according to claim 1, wherein an initial position of the focal plane of the objective lens is arranged below the upper surface and wherein the objective lens is moved upwards while capturing the images of the spot.

3. The method according to claim 1, wherein an initial position of the focal plane of the objective lens is arranged above the upper surface and wherein the objective lens is moved downwards while capturing the images of the spot.

4. The method according to claim 1, wherein the focus score is calculated based on an average pixel intensity and number of pixels occupied by the spot.

5. The method according to claim 4, wherein determining the position of the upper surface in relation to the objective lens comprises identifying a position of the objective lens corresponding to a maximum focus score.

6. The method according to claim 1, further comprising moving a detector surface, capturing the image of the spot, synchronised with the scanning light beam such that the spot is substantially stationary on the detector surface.

7. The method according to claim 1, wherein a sweep length of the light beam in the focal plane exceeds a diameter of the spot in the focal plane.

8. The method according to claim 1, further comprising:
   capturing a plurality of images of a spot formed by the light beam being reflected at a lower surface of the bottom of the sample vessel while moving the objective lens towards the bottom;
   calculating a focus score of each of the plurality of images of the spot reflected at the lower surface; and
   determining, based on the focus score, a position of the lower surface in relation to the objective lens.

9. The method according to claim 8, wherein the position of the lower surface is determined prior to determining the position of the upper surface.

10. The method according to claim 1, wherein the reflected spot is imaged using the objective lens.

11. The method according to claim 1, wherein the light beam is a laser beam.

12. The method according to claim 1, wherein the scanning microscope is a confocal scanning microscope.

* * * * *